United States Patent [19]

Inoue

[11] Patent Number: 4,980,698

[45] Date of Patent: Dec. 25, 1990

[54] METHOD AND SYSTEM FOR RECORDING IMAGE DATA BY THERMAL HEAD

[75] Inventor: Nobuhiro Inoue, Hachioji, Japan

[73] Assignee: Kabushiki Kaisha Toshiba, Kawasaki, Japan

[21] Appl. No.: 322,606

[22] Filed: Mar. 10, 1989

[30] Foreign Application Priority Data

| | | | |
|---|---|---|---|
| Mar. 18, 1988 | [JP] | Japan | 63-66517 |
| Mar. 18, 1988 | [JP] | Japan | 63-66520 |
| Mar. 18, 1988 | [JP] | Japan | 63-66522 |

[51] Int. Cl.⁵ .......... G01D 15/10

[52] U.S. Cl. .......... 346/1.1; 346/76 PH

[58] Field of Search .......... 346/76 PH, 1.1

[56] References Cited

U.S. PATENT DOCUMENTS 4,251,822 2/1981 Hara et al. .......... 346/139 C

OTHER PUBLICATIONS

Timoshenko et al., "Theory of Elasticity," McGraw-Hill, pp. 402-419, 1970.

*Primary Examiner*—Bruce A. Reynolds

*Assistant Examiner*—Gerald E. Preston

*Attorney, Agent, or Firm*—Finnegan, Henderson, Farabow, Garrett and Dunner

[57] ABSTRACT

A thermal recording apparatus records image data line-by-line, using a thermal head having a linear array of heating elements. Each of the heating elements is shorter in the sub scan direction than in the main scan direction. To form an image of one recording line, the feeding of a recording paper and the transfer of ink onto the paper are repeated a plurality of times—for example, two times—using the image data for that line. The excellent thermal response of the heating element constructed as above, and the use of a plurality of recording operations for one recording line image formation, provides a uniform recording density distribution curve, so that the recorded image has high image quality and is substantially free from recording density irregularity. An additional recording control employed eliminates a nonimage part which will occur due to a varied recording speed.

8 Claims, 18 Drawing Sheets

METHOD AND SYSTEM FOR RECORDING IMAGE DATA BY THERMAL HEAD

BACKGROUND OF THE INVENTION

1. Field of the Invention

The present invention relates to a method and system for recording image data by use of a thermal head.

2. Description of the Related Art

Characteristics of a thermal recording apparatus, such as a thermal transfer recording apparatus or a heat sensitive recording apparatus include excellent consistency in the quality of resultant hard copy, low noise, and low cost. A thermal recording apparatus records image data by heating a thermal head. In the thermal transfer recording apparatus with a thermal head and an ink ribbon (ink film), the ink ribbon is placed between the thermal head and a recording paper on a platen roller. To record the image data, the thermal head is pressed against the recording paper, heating elements contained in the thermal head is heated, and ink of the ink ribbon is transferred onto the recording paper.

A facsimile apparatus generally employs an image recording system of the heat sensitive recording apparatus or the thermal transfer recording apparatus. In the image recording systems, after a recording paper is vertically shifted or fed, the image data of each line is horizontally recorded on the recording paper. In this case, a line type thermal head is used whose width corresponds to the width of the recording paper. In the thermal head, heating elements are linearly arrayed. The direction in which the array of heating elements extends when the thermal head is set to the recording apparatus, is called the main scan direction, while the direction orthogonal to the main scan direction, viz., the direction in which the recording paper is fed, is called the sub scan direction.

To short the facsimile data transmission time, the image data read is digitized for each picture element (pixel), and encoded before being transmitted. The widely used encoding processes are:

(1) To encode image data in accordance with the number of pixels of the same color running consecutively in the encoding line. The length of such consecutive pixels is called a run-length, more exactly, the length of consecutive white or black pixels extending in the scanning direction (one-dimensional encoding).

(2) To encode image data by determining modes depending on the states of pixels at the corresponding positions between an encoding line and a reference line previous to the encoding line (two-dimensional encoding).

In the encoding process (1) above, the pixels are reproduced on the basis of a variable run-length. In the encoding process (2), a mode is determined on the basis of a variable length code, and the image reproduction is performed by obtaining the position of changing of the image representing the pixel, for example, when the image changes from white to black. A speed of encoding and decoding varies depending on a state of an image, and hence the recording speed is nonuniform. In the recording operation of the heat sensitive type and of the thermal transfer type, a recording paper is fed, and the inertia causes the recording paper to possibly overrun in the feeding motion. The feeds of the paper are irregular. Because of this, space is produced between adjacent recording lines. To cope with the production of the space, a conventional recording is to use a thermal head having the heating elements which are longer in the sub scan direction than in the main scan direction, and to use a paper feed pitch which is slightly shorter than the length of the heating element in the sub scan direction. In an image recording, the images of the two adjacent recording lines partially overlap.

The lead wires coupled with each heating element are made of conductive material of excellent heat transmission property. Accordingly, the energy of heat of the heating element near the lead wires decreases faster than the energy of heat in the central part. Therefore, a recording energy distribution curve of the heating element of the conventional thermal head peaks at the center of the element. To heat the heating element so that a predetermined recording density can be obtained within a predetermined recording area, it is necessary to supply to the heating element the energy of heat in excess of a recording energy corresponding to a maximum recording density. Further, temperature at the central part of the heating element is higher than that at the surrounding part. Therefore, when the image is thermally transferred onto a recording paper, the ink at the central part is apt to flow toward the surrounding part, so that a recording density is reduced at the central part and hence a recording density is irregular over the recorded image within the pixel area.

A thermal response of the heating element is problematic when the image is recorded at a constant speed. In the conventional heating element, a cooling speed at the central part of the heating element is slow. Accordingly, a long time is taken till the temperature at the central part decreases to an unrecordable temperature. For this reason, when the color of the image as a pixel changes from black to white, an image signal indicating white is applied to the heating element, but black remains due to its heat inertia.

In the image recording of the thermal transfer type, a degree of contact of the ink film with the recording paper affects an image quality of the recorded image. Allowing for this, a thermal head of a partial graze type in which each heating element is protruded at the central part, has been employed. A peak pressure of the partial graze type thermal head is higher than that of an overall graze type thermal head. Therefore, the partial graze type thermal head can make a closer contact of the ink film and the recording paper than an overall graze type thermal head whose heating element has a flat top. In this respect, the former is superior to the latter. However, in the partial graze type thermal head, the ink at the central part of the heating element tends to flow toward its surrounding part, so that a recording density at the central part is lower than that at the surrounding part.

The thermal head is fixed at one end, and free at the other end, so that it is swingable about the fixed end, which acts as a fulcrum. Such a structure is employed to ensure the positioning of the recording paper and the ink film in the thermal recording apparatus. If a backlash in the moving structure occurs, the center of the heating element shifts to another position. If the center is so shifted, the heating element is partially out of a recordable area. A part of the heating element out of the recordable area fails to press the ink film against the recording paper, so that an image recorded under such a condition is imperfect while having non image part corresponding to the press-failed-part. This is proper to the partial graze type thermal head, and exists in both the thermal transfer type recording apparatus and the heat sensitive type recording apparatus. A contact pressure between the thermal head and the platen roller is higher in the central part of the heating element than in the surrounding part. Therefore, a degree of contact therebetween is excellent. However, a high contact pressure expels the melted ink from the central part of the heating element toward the surrounding part. As a result, a recording density at the central part is reduced. In addition, a thickness of the ink layer over the recording paper is nonuniform. This brings an instable peeling-off of ink. An image recorded under such a condition blurs in its contour.

For the above background reasons, there is a desire for image recording apparatuses which is low in power consumption and free from reduction of a recording density and deterioration of an image quality.

SUMMARY OF THE INVENTION

Accordingly, an object of the present invention is to provide a method and system for recording image data by a thermal head.

According to one aspect of the present invention, there is provided a system for recording image data on a subject, comprising: buffer means for storing the image data corresponding to a single line; a thermal head including a plurality of heating elements arranged in a line direction, for heating a subject moved in a row direction, in accordance with the image data stored in the buffer means, each of the heating elements being shorter in the row direction than in the linear direction; determining means for determining whether or not the image data corresponding to a single line is stored in the buffer means; moving means for moving the subject by a predetermined pitch in the row direction; and control means for controlling the thermal head and the moving means in accordance with a determination result obtained by the determining means.

According to another aspect of the present invention, there is provided a method for recording image data on a subject, the method comprising the steps of: storing the image data corresponding to a single line; driving a thermal head including a plurality of heating elements arranged in a line direction, for heating the subject moved in a row direction, each of the heating elements being shorter in the row direction than in the line direction, to record the stored image data on the subject; and moving the subject by a predetermined pitch in the row direction.

DETAILED DESCRIPTION OF THE PREFERRED EMBODIMENT

A preferred embodiment of the present invention will be described in detail in comparison with the prior art.

Figure 1A:
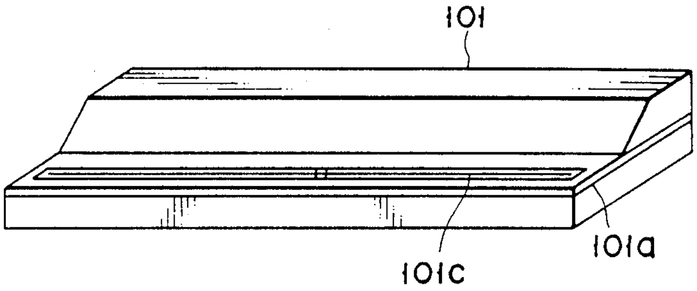
FIGS. 1A AND 1B show a perspective view of a conventional thermal head and an enlarged view of heating elements contained in the thermal head.
Figure 1B:
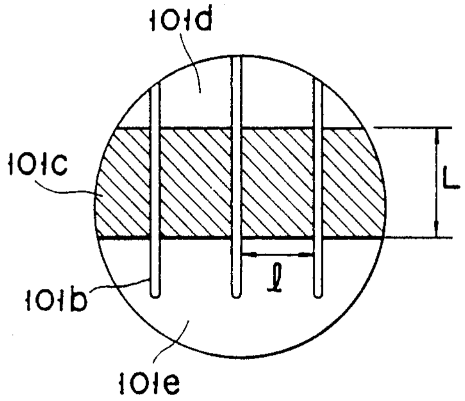

As shown in FIGS. 1A and 1B a conventional thermal head 101 used in a facsimile apparatus is provided with a number of minute heating elements 101*c* which are closely located and linearly arrayed on a substrate 101*a* in the sub scan direction. An insulating layer 101*b* electrically insulates the adjacent heating elements from each other. Each heating element 101*c* is coupled at both ends with lead wires 101*d* and 101*e* through which a current is supplied thereto in accordance with the image data.

Figure 2A:
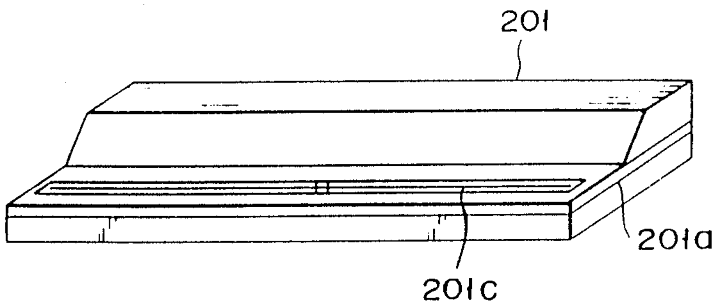
FIGS 2A and 2B show a perspective view of a thermal head according to the present invention and an enlarged view of heating elements contained in the thermal head.
Figure 2B:
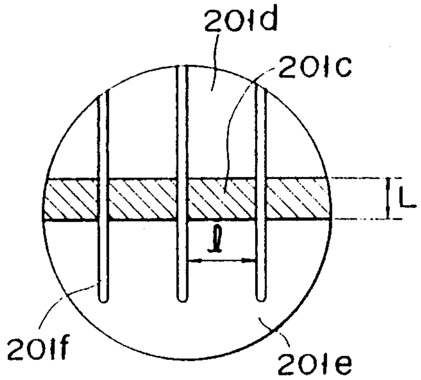

A thermal head according to the present invention is illustrated in FIGS. 2A and 2B. As shown, a thermal head 201 is provided with a number of heating elements 201*c* which are closely located and linearly arrayed on a substrate 201*a* in the sub scan direction. It is noted that a length "l" of the heating element 201*c* in the main scan direction is longer than a length L extending in the sub scan direction (l>L), whereas in the conventional heating element, the length "l" is shorter than the length "L" (l<L). More exactly, in the conventional heating element, for example, the main scan directional length "l" is 110 μm, and the sub scan directional length "L" is 190 μm. One pixel is recorded by one heating element through one-time recording operation.

In the heating element according to the present invention, for example, the main scan directional length "l" is 110 μm and the sub scan directional length L is 90 μm. Heating elements 201c are electrically insulated by insulating layers 201f. The heating element 201c is connected at one end to a common lead wire 201e, while at the other end to a lead wire 201d. The lead wire 201d is earthed through a transistor (not shown). The common lead wire 201e is connected to a power source (not shown). The supply of current to this heating element 201c is controlled by turning on and off the transistor.

Figure 3:
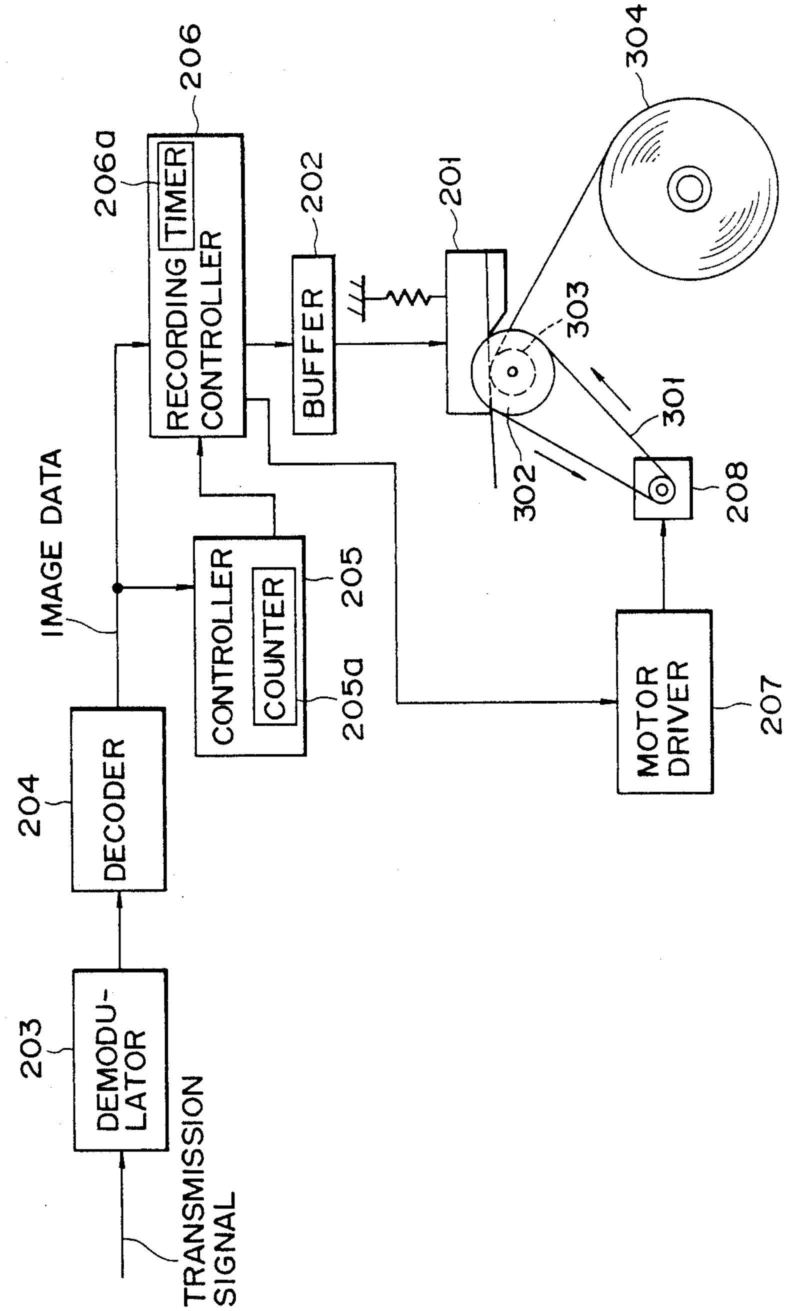
FIG. 3 is a diagram showing an image recording system in a facsimile apparatus which is an embodiment of the present invention.

As shown in FIG. 3, the image recording system according to the present invention is comprised of a pulse motor 208 for turning a pulley 302 through a belt 301, a motor driver 207 for driving the pulse motor 208, a platen roller 303 coupled with the pulley 302, a heat sensitive recording paper 304 that is nipped by the thermal head 201 and the platen roller 303 and is fed by the platen roller 303, a demodulator 203 for demodulating the signal transmitted from another system, a encoder 204 for encoding the signal demodulated by the demodulator 203, a controller 205 for controlling the image recording system, a recording controller 206 for controlling a recording operation by the thermal head 201, and a buffer 202 for storing the image data of one recording line.

The controller 205 contains a counter 205a which counts the decoded image data and is cleared every time a count of one recording line is reached. The controller 205 continues the outputting of a record stop signal to the recording controller 206, and stops the outputting of the record stop signal when the contents of the counter 205a reaches a value of one recording line. At the end of a page or at the end of receiving the image data from another apparatus, the controller 205 controls a cutter mechanism (not shown) to cut a recording paper.

The recording controller 206 sequentially stores the image data transferred from the decoder 204, and transfers the image data of one recording line to the buffer 202, when the controller 20 stops the outputting of the record stop signal. The image data loaded in the buffer 202 is recorded on a recording paper, and then the recording paper is fed by a predetermined pitch. The controller 20 and the recording controller 206 contain microcomputers (not shown), respectively.

The motor driver 207 generates a drive pulse signal to feed the recording paper by a one-pitch every time it receives a paper feed command signal from the recording controller 206. The motor 208 for feeding the heat sensitive paper 304 is turned by one pitch every time it receives a drive pulse signal. The sub scan directional length L of the heating element 201c is about half of that of the conventional heating element. To record the width of one recording line by using the thermal head according to the present invention, the recording paper must be fed by two pitches. The two pitch feed may readily be realized by merely doubling a reduction gear ratio of a reduction gear mechanism associated with the motor.

In the image recording system thus arranged, a signal transmitted from another system is demodulated by the demodulator 203, and decoded by the decoder 204, and then input to the recording controller 206. The counter 205a in the controller 205 counts the image data from the decoder 204. When the contents of the counter 205a reaches the number of the image data corresponding to one recording line, the controller 206 stops a record stop signal applying to the record controller 206. At the instant that the supply of the record stop signal from the controller 205 is stopped, the recording controller 206 supplies the image data of the one recording line to the buffer 202. The image data of the buffer 203 is transferred to the thermal head 201. In accordance with the image data, the heating elements are heated, and the image data is recorded. After the completion of recording the image data, the recording controller 206 produces a feed command signal for transfer to the motor driver 207. In response to the feed command signal, the motor driver 207 produces a drive pulse signal and applies it to the motor 208. The motor 208 turns by one pitch. The length of one pitch is equal to about half of the width of one recording line as obtained through one pitch motion of the conventional thermal head relative to the recording paper. While the controller 205 applies the record stop signal to the recording controller 206, the recording controller 206 prohibits the thermal head 201 from recording the image data of the next recording line, after the one recording line image data has been recorded.

When the counter 205a is cleared, the record stop signal is stopped, and the thermal head records the same one recording line image data again. In synchronism with this, the pulse motor 208 is driven to feed the heat sensitive recording paper 304 by a pitch equal to the half of the conventional pitch. Thus, following the stop of outputting the record stop signal, the heat sensitive recording paper 304 is fed by one pitch, and then the currents are led to the thermal head 201. In this way, the recording of the one recording line image data is completed through the paper feed of two pitches. In the above operation of paper feed and image recording, the paper feed may follow the image recording, if necessary. When the decoding process is performed at a high speed, the paper feed occurs simultaneously with the image recording. Accordingly, the recording paper is consecutively fed. In case that the decoding process is performed slowly, after the recording of the image data of one recording line is completed, the image data of the next recording line is still being decoded. Under this condition, a record stop signal is being output. The recording paper being fed cannot stop suddenly due to its inertia, and will overrun. To cope with the overrun, the record controller 206 performs an additional recording control (to be described later) by using the image data of the previous recording line, after a predetermined time period elapses.

The explaining of a nonuniform paper feed follows.

Figure 4:
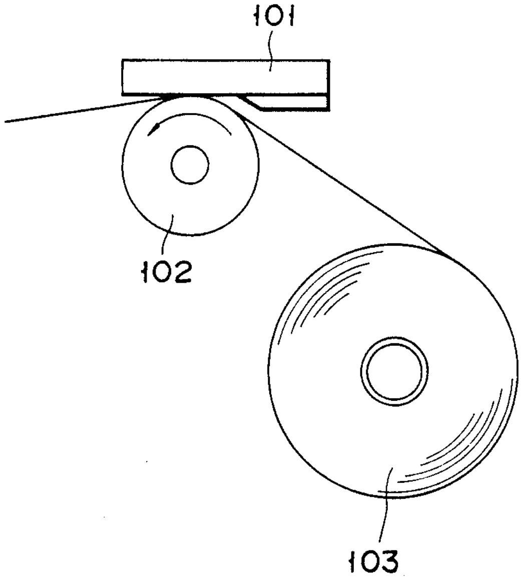
FIGS. 4 and 5 show diagrams for explaining the image recordings of heat sensitive type and of the thermal transfer type.

In the heat sensitive recording by a mechanism as shown in FIG. 4, the recording paper 103 is fed by the platen roller 102 driven by a motor (not shown). The heating elements are selectively heated in accordance with the image data applied thereto, so that an image is recorded on the heat sensitive paper 103.

Figure 5:
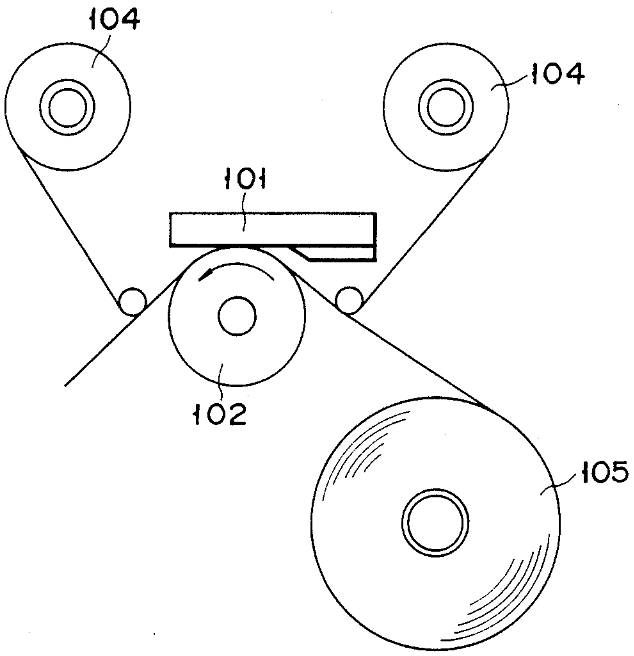

In the thermal transfer recording by a mechanism as shown in FIG. 5, the platen roller 102 is driven by a motor (not shown). At the same time, the ink film 104 is fed. The ink film 104 which has a width equal to the width of the recording paper and is coated with thermal transfer ink, is laid over the thermal transfer paper 105, and those are nipped between the platen roller 102 and the thermal head 101. Accordingly, the recording paper 105 and the ink film 104 are fed together while being made closely contact. The heating elements of the thermal head 101 are heated by the currents and melt the ink on the ink film 104, and an image corresponding to the image data is recorded on the thermal transfer recording paper 105.

In the image recordings of the heat sensitive type and the thermal transfer type by the mechanisms shown in FIGS. 4 and 5, the platen roller and the recording paper have each an inertia. In the facsimile apparatus, the image data is decoded at different timings. Accordingly, the recording speed is not constant, and the overrun of the recording paper due to their inertia causes nonuniform paper feeds. When the recording paper overruns a distance in excess of the sub scan directional length of the heating element, a space, i.e., a nonimage part, appears between the adjacent recording lines.

Figure 6:
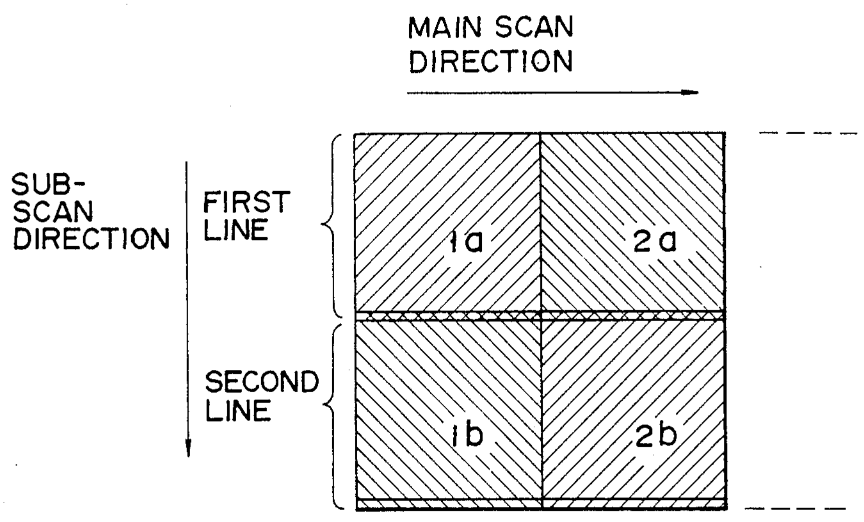
FIG. 6 shows a diagram for explaining a conventional image recording method.
Figure 7:
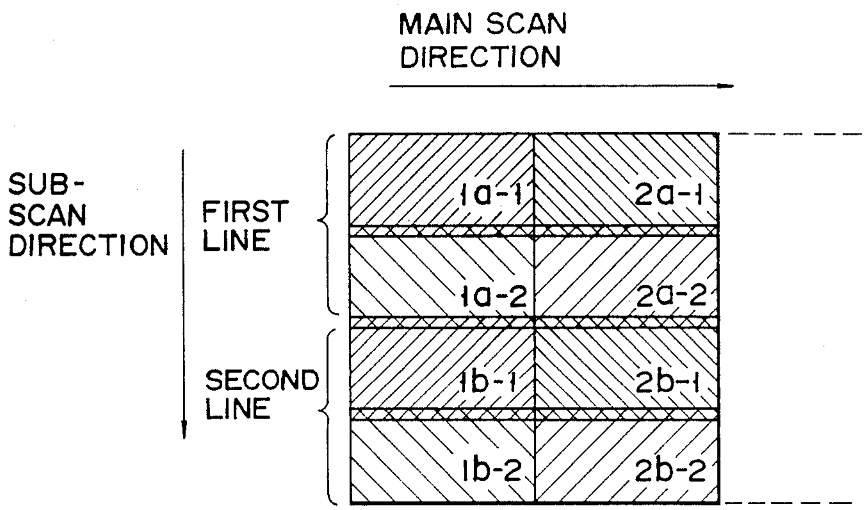
FIG. 7 shows a diagram for explaining an image recording method according to the present invention.

As already mentioned, in the image formation by the conventional thermal head, as shown in FIG. 6, the first line includes pixels 1*a*, 2*a*, . . . , and the second line includes pixels 1*b*, 2*b*, . . . , the first and second lines partially overlap. In the image formation by the thermal head according to the present invention, as shown in FIG. 7, the upper half of the first line includes pixels 1*a*-1, 2*a*-1, . . . , and the lower half of the first line includes pixels 1*a*-2, 2*a*-2, . . . on the same image data as that for the upper half. The recordings of the upper and lower halves are combined to form the image recording of the first line. Likewise, the upper half of the second line includes pixels 1*b*-1, 2*b*-1, . . . , the lower half of the second line includes pixels 1*b*-2, 2*b*-2, . . . , the second line recording is completed by the recordings of the upper and lower halves.

Figure 8:
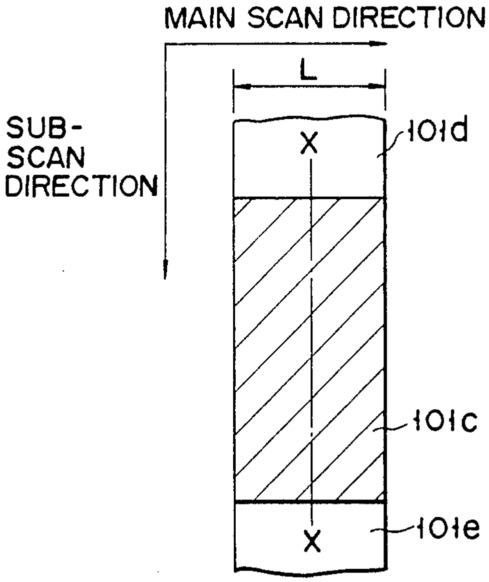
FIGS. 8, 9, 11 and 12 are diagrams showing recording characteristics of a conventional heating element.
Figure 9:
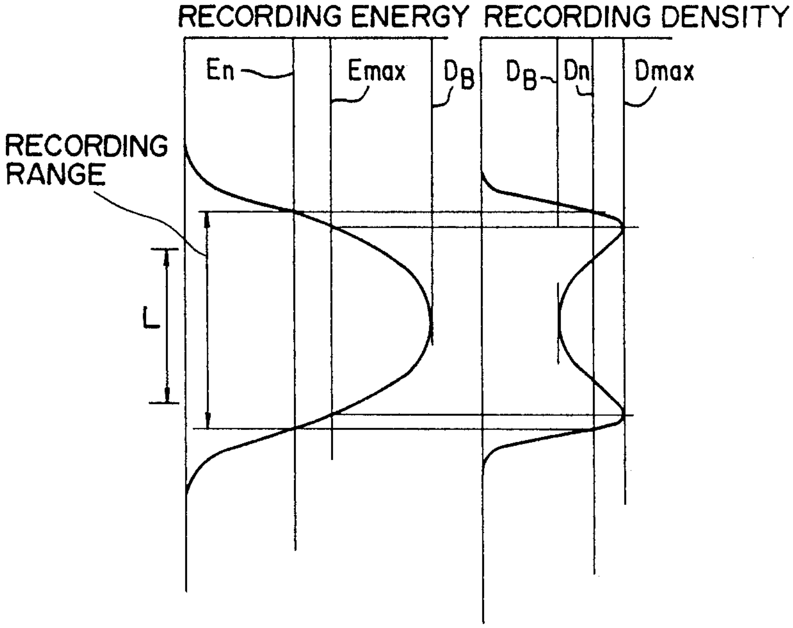

A recording energy distribution of a conventional heating element shown in FIG. 8, which is along line X—X, is as shown in FIG. 9. The reason why the recording energy is distributed as shown will be given below. The lead wires 101*d* and 101*e* coupled with the heating element 101*c* are made of a conductive material having a excellent heat transmission. Accordingly, the energy of heat of the heating element near the lead wires 101*d* and 101*e* decreases faster than that in the central part of the heating element. Therefore, to heat the element by supplying a recording energy En to provide a predetermined recording density Dn within a predetermined recording area, it is necessary to supply to the heating element the energy of heat in excess of the recording energy Emax to provide a maximum recording density Dmax in the recording characteristic shown in FIG. 10. Further, temperature at the central part of the heating element 101*c* is higher than that at the surrounding part. Therefore, when the image is recorded onto a recording paper by an ink film, the ink at the central part of the thermal head is apt to flow, so that a recording density thereat is decreased.

Figure 10:
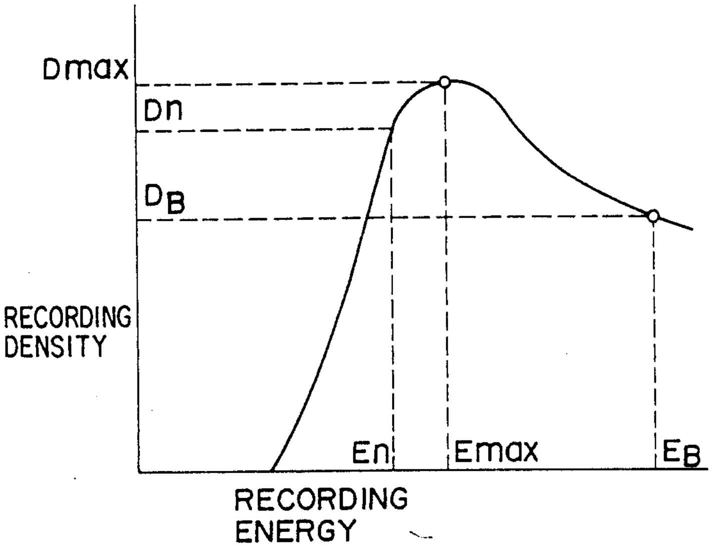
FIG. 10 is a graph showing a relationship between recording density and recording energy of a heating element.

This tends to occur in the intermittent recording condition, that is, a recording of the image data by feeding the recording paper step by step. A high energy requires in this condition. In the case of the thermal transfer recording, an irregularity occurs in the recording density of the image. In FIG. 10, reference symbol $E_B$ indicates a limit of energy below which the heating element is not damaged.

In the constant speed recording of image, the thermal response of the heating element is problematic. If the cooling of the heated heating element is slow, in a transient state that the image data representing a black changes to a white, even if the image data indicating white is applied to the heating element, it possibly records black because of its thermal inertia.

Figure 11:
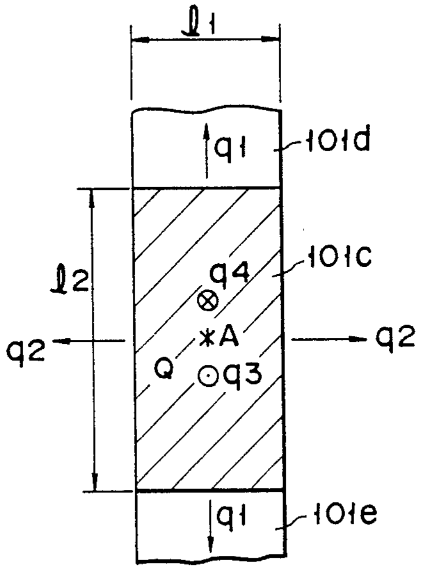
Figure 12:
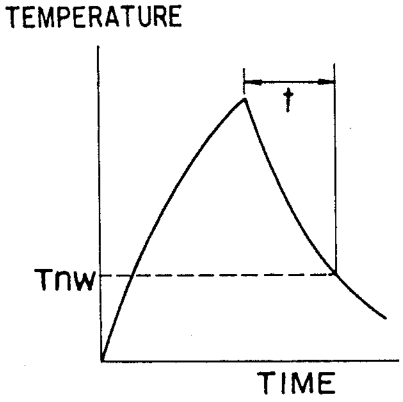

Let us consider movements of heat in the heating element 101*c* with reference to FIG. 11. Heat energy q1 moving toward the lead wires 101*d* and 101*e* changes in accordance with the main scan directional length "l1" of the heating element 101*c*. Heat energy q2 moving toward the heating elements adjacent to the heating element 101*c* changes in accordance with the sub scan directional length "l2" of the heating element 101*c*. Heat energy q4 and q3 moving in the directions that are reverse to and the same as that of the existence of the recording paper, changes in accordance with an area l1×l2 of the heating element 101*c*. Of those heat energy, the heat energy q3 alone contributes to the image recording. Those energy are q3>q1>q4>q2 (in specific cases, q2>q4). A difference between the energy q1 and q4 is great.

The above heat energy q1 to q4 are radiated from the heating element 101*c*. Another type of heat energy Q exists which is accumulated in the heating element 101*c*. The energy Q increases as the area l1×l2 becomes larger. When the energy Q is high, the temperature of the heating element is high. To quicken the cooling of the heated heating element, it is necessary to reduce the energy Q by utilizing the energy q1, q2 and q4. Of those energy, the energy q1 could be most effective for the reduction of the energy Q.

In the conventional heating element, the cooling speed at its central part is slow and hence a time period t taken for an unrecordable temperature Tnw at point A is long. For this reason, in the case of the image recording of the constant speed, the pixel to be white remains black. This leads to reduction of the image quality.

Figure 13:
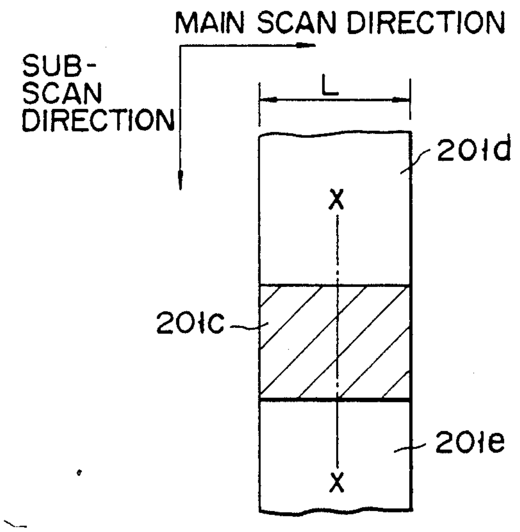
FIGS. 13 through 16 are diagrams show recording characteristics of a heating element according to the present invention.
Figure 14:
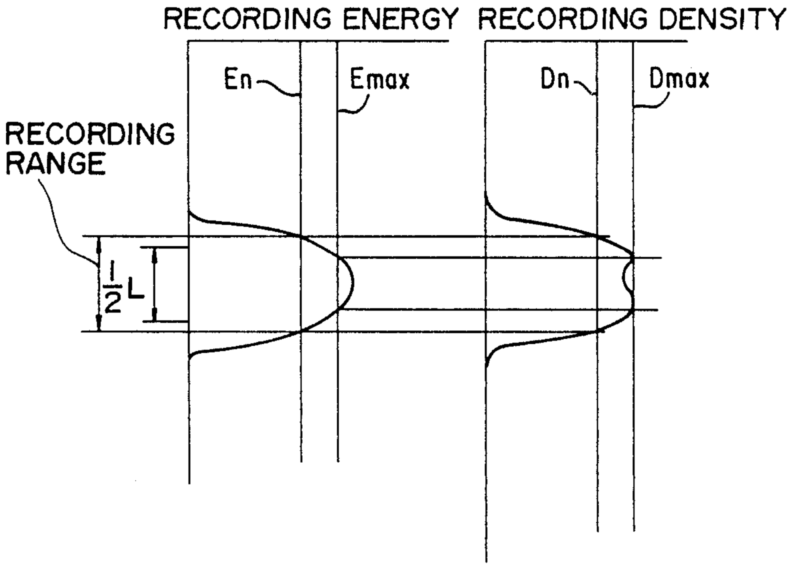

To cope with this problem, a heating element according to the present invention is designed such that the sub scan directional length of the heating element is shorter than the main scan directional length, as shown in FIG. 13. The designed heating element exhibits a recording energy distribution as shown in FIG. 14, along line X—X (FIG. 13). When using the heating element, the thermal head does not need to record a pixel corresponding to the width of one recording line by one-time recording operation. In other words, the area of the heating element to be heated by one-time recording operation is small. Accordingly, there is eliminated a nonuniformity in the temperature distribution due to heat dispersion. This implies that even when a recording density on the surrounding of the recording area is set at the necessary density Dn, an amount of heat energy exceeding the recording energy Emax providing the maximum recording density Dmax can be small.

Figure 15:
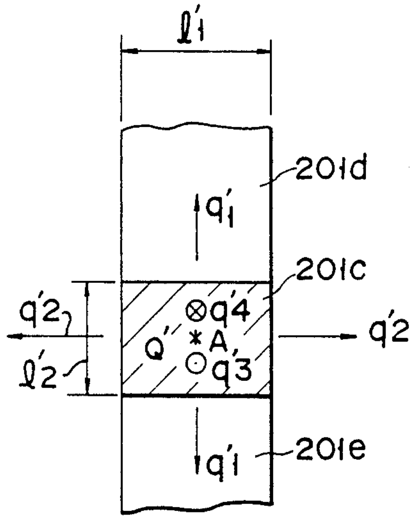

In the heating element according to the present invention, as shown in FIG. 15, heat energy q1, moving toward the lead wires 201*d* and 201*e* changes in accordance with the main scan directional length l1′ of the heating element 101*c*. Heat energy q2′ moving toward the heating elements adjacent to the heating element 101*c* changes in accordance with the sub scan directional length l2′ of the heating element 101*c*. Heat energy q4′ moving in the direction that is reverse to that of the existence of the recording paper changes in accordance with an area l1′×l2′ of the heating element 101*c*. Heat energy q3′ moving in the same direction as that of the existence of the recording paper, also changes in accordance with an area l1′×l2′ of the heating element 101*c*. The heat energy q3′ contributes to the image recording. Those energy are q3′>q1′>q4′>q2′. A difference between the energy q1′ and q4′ is great. In specific cases, q4′<q2′ holds. In addition to those energy, another type of heat energy Q′ exists which is accumulated in the heating element 101*c*. The energy Q′ increases as the area l1′×l2′ becomes larger.

When comparing the above heating element with the conventional heating element, l1=l1' and hence q1=q1', and l1×l2>l1'×l2', thereby leading to Q>Q'. Since q1=q1', it is seen that the energy Q had better to be small, to quicken the cooling of the heating element temperature.

Figure 16:
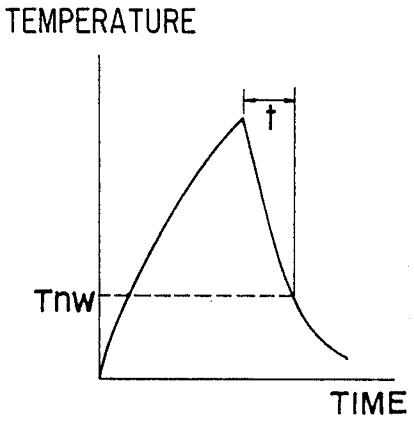

It is noted that since a distance of the heating element of the present invention from the center to each lead wire is short than that of the conventional heating element (l2'<l2), a shorter time is taken for the heat to reach each lead wire, and hence a thermal response as shown in FIG. 16 is obtained.

Figure 17:
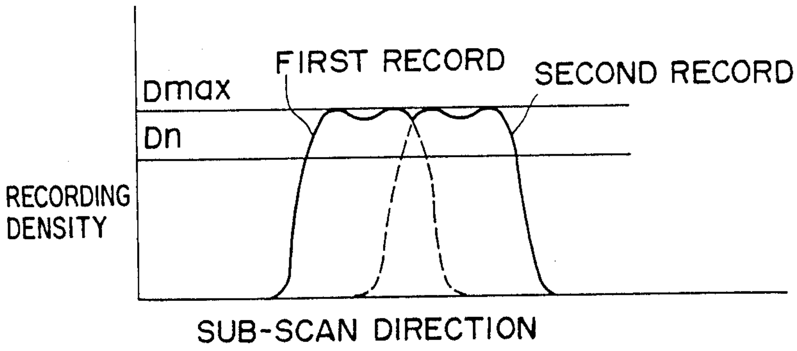
FIGS. 17 and 18 are graphs showing recording characteristics based on an image recording method according to the present invention.
Figure 18:
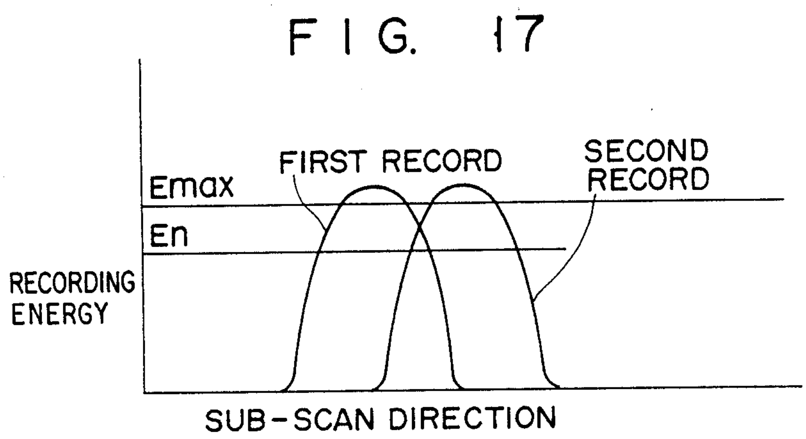

As described above, the sub scan directional length of the heating element according to the present invention is shorter than the main scan directional length. For an image of one recording line, the recording operation is repeated two times by using the same image data. A recording energy distribution as obtained is therefore as shown in FIG. 18. It is noted further that a recording density distribution curve is flattened as shown in FIG. 17. The flattened curve of the density distribution indicates that a density over the width of one recording line is uniform, resulting in improvement of a image quality.

A relationship between size of the heating element vs recording energy will be described.

Figure 19:
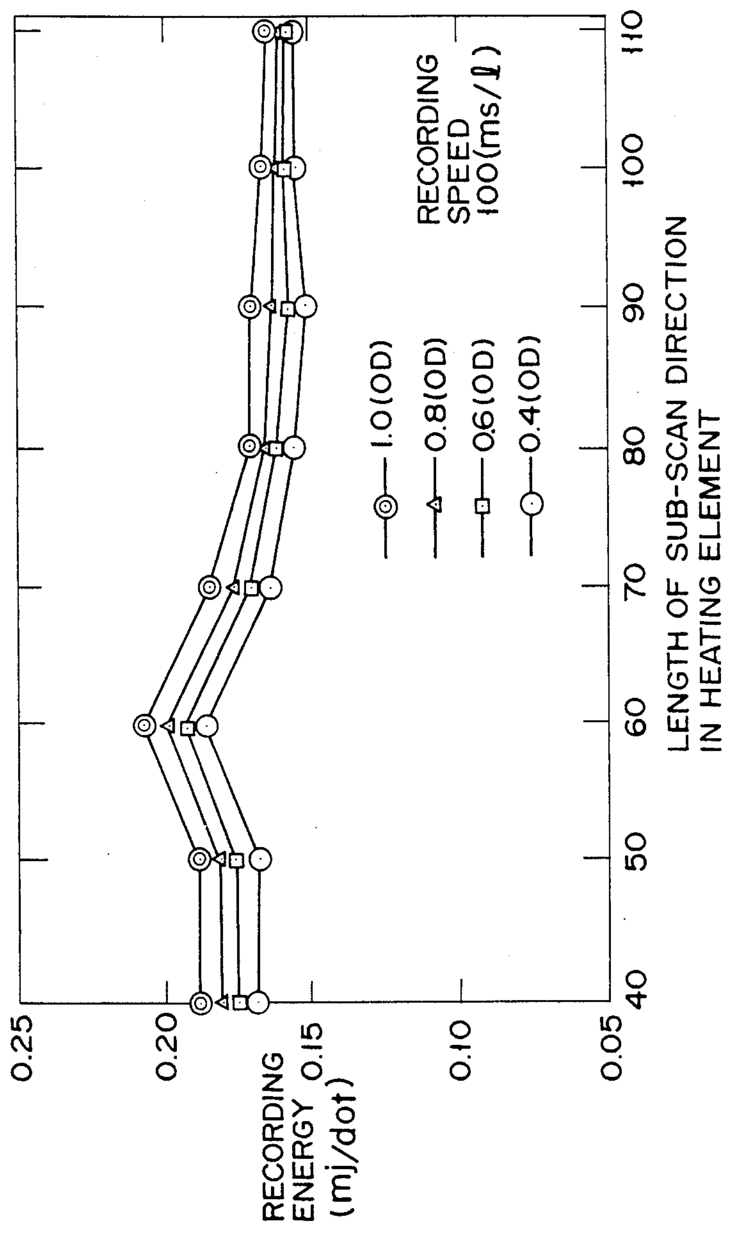
FIG. 19 shows a relationship among a length of a heating element in the sub scan direction, recording energy and recording density of the heating element.

The relationship is illustrated in FIG. 19. In a graph of FIG. 19, the main scan directional length of the heating element is equal to that of the conventional heating element. The sub scan directional length is varied from 40 μm to 110 μm in the steps of 10 μm. Four different optical densities (ODs), 1.0, 0.8, 0.6, and 0.4 are used and are plotted as parameters in the graph. 1.0 of OD indicates dark black, and the color becomes lighter (white) in accordance with the decrease of OD. The graph shows that a peak recording energy exists at 60 μm of the sub scan directional length of the heating element. The recording energy at 80 μm or more is approximately 15% smaller than that at 60 μm. In the length of 110 μm or more (not illustrated), a current for heating the heating element increased. The characteristics in the FIG. 19 show that a length of the heating element in the sub scan direction is approximately 90 μm, allowing for a geometrical accuracy of the manufactured heating element and nonuniform paper feeds.

In the above-mentioned embodiment, the sub scan directional length is about ½ of that of the conventional heating element. It is noted, however, that in the present invention, the sub scan directional length is shorter than the main scan direction length. Deduced from this, the sub scan directional length of the heating element of the present invention may be 1/n of that of the conventional one. In this case, for recording the image of one recording line, the same image data is repeatedly recorded at the width of 1/n and n times.

As seen from the foregoing description, the feature of the present invention to use the sub scan directional length shorter than the main scan length improves a thermal response of the heating element. Accordingly, the color change from black to white is smooth, and an irregularity in the recording density is removed. The repetitive recording operations at subdivided pitches for recording the one recording line image uniforms a density distribution over an area of one pixel. A small amount of current is required for heating the heating element, in comparison with that for the conventional heating element. With the above repetitive recording operation attendant with partially overlapping recordings, a required density of the image can be secured although a recording density at the surrounding part of the heating element is low in one recording operation.

As already described, in the facsimile apparatus, the image data is compressed before it is transmitted. Because of this, the data transmission speed is not a constant. The platen, its drive mechanism including a motor, a rotational force transfer mechanism, and the like, and a recording paper have the property of an inertia. The paper feeds for each line recording are not a constant when the recording speed varies. Particularly when the thermal head operation shifts a recording phase to a recording stop phase and the recording paper overruns a distance in excess of a predetermined pitch, a space having nonimage appears between the adjacent recording lines, resulting in reduction of an image quality.

Figure 20:
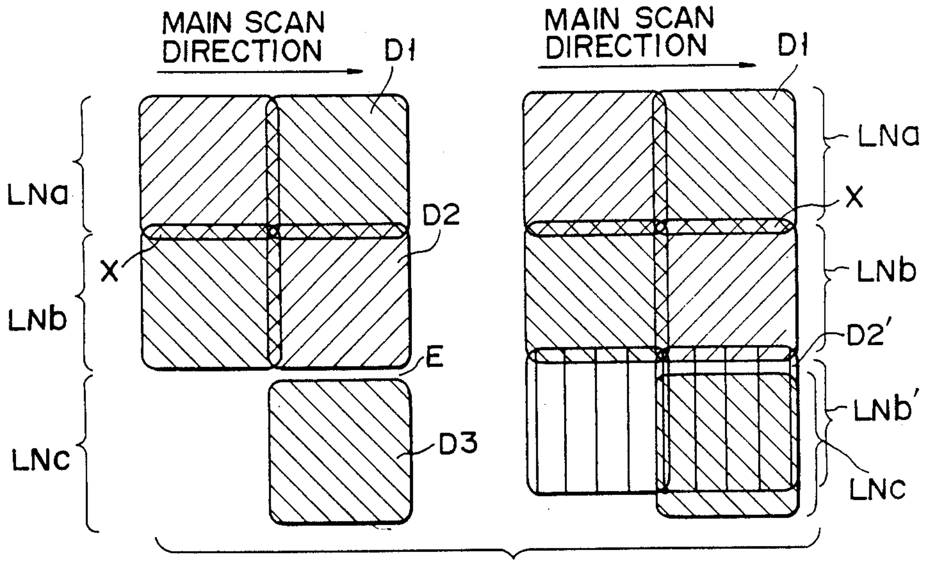
FIGS. 20 and 21 are diagrams showing an image recorded by using a conventional thermal head.

To cope with this, the recording is performed to partially overlap the recording lines each other. If the overlapping area is excessive, the width of one recording line becomes shorter. It is supposed that the image data is smoothly encoded and is successively supplied to the heating elements of the thermal head. In this case, an overlapping area X between two adjacent lines containing dots D1 and D2 in FIG. 20 is an optimum area. When the encoding process takes a long time, however, the recording operation of the thermal head shifts from the recording phase to the stop phase, and the paper feed is stopped. At this time, the recording paper overruns due to its inertia. Under this condition, the recording for the next recording line is performed following the completion of the encoding process, a nonimage part E appear between the recording lines LNb and LNc. To avoid this, when the paper feed is being stopped because the encoding process has not been completed yet, one recording line LNb' is recorded again at a predetermined timing by using the image data used for recording the previous line LNb. Such a recording is made when a count of the counter, which is counting the image data, is below a value of the image data of one recording line. The resultant image is an additional dot D2'. Subsequent to the encoding process, a dot D3 for the next recording line LNc is recorded. The overlapping area occurs between the two adjacent recording lines as viewed vertically. Although illustrated for ease of explanation, no overlapping area actually occurs between the adjacent recording lines as viewed in the main scan direction, because of the structure of the thermal head.

Figure 21:
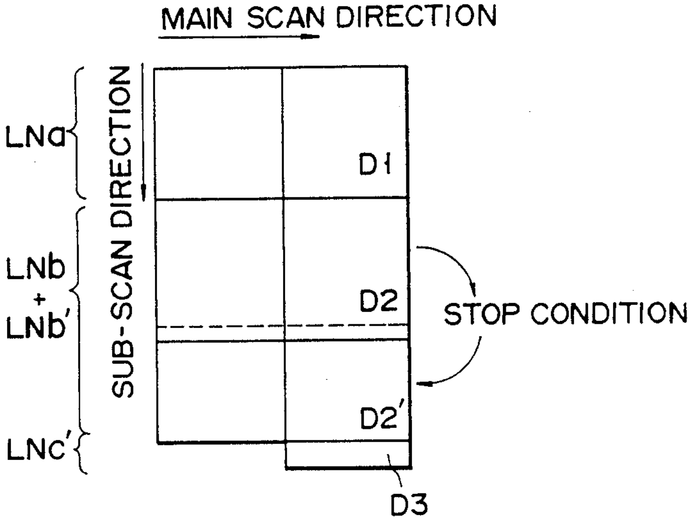

According to the additional recording operation as just mentioned, the additional dot D2' may be recorded over the nonimage part E for removal of the nonimage part. If so done, the recording line LNb is widened by a recording line LNc' in the sub scan direction, so that the next recording line LNc becomes the recording line LNc', as shown in FIG. 21. Since in the conventional additional recording operation, a frequency of occurrence of the additional recording is high, reduction of the image quality is inevitable.

Figure 22:
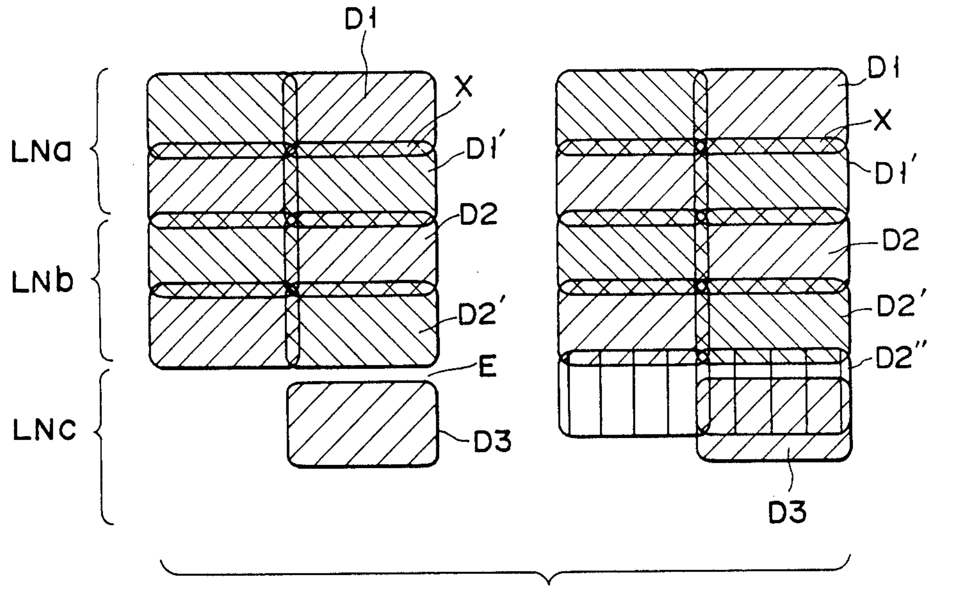
FIG. 22 is a diagram showing an image recorded by using a thermal head according to the present invention.

In FIG. 22, the recording of the same image data in one recording line is repeated two times at subdivided pitches. The right figure includes a nonimage part E between the adjacent recording lines LNb and LNc. The left figure does not include the nonimage part an additional dot D2''. According to the additional recording operation of the present invention, the additional recording is performed during the overrun of the recording paper. When not performed, a nonimage part E will appear between the dots D2' of the recording line LNb and the dot D3 of the recording line LNc, because the paper cannot stop suddenly. After the completion of the recording, when new image data of one recording line is not stored in the recording controller 206, the additional dot D2Δ is recorded by using the image data of the previous recording line at a predetermined timing, before the recording paper stops. When the new image data is stored, a dot D3 is recorded by using the new image data. In this way, by recording the additional dot D2" during the overrun, the occurrence of the nonimage part E may be prevented.

While the above description is referred to the image recording operation that the recording operation is repeated two times for forming an image of one recording line, the recording may be repeated n times for formation of the one recording line image.

Figure 23:
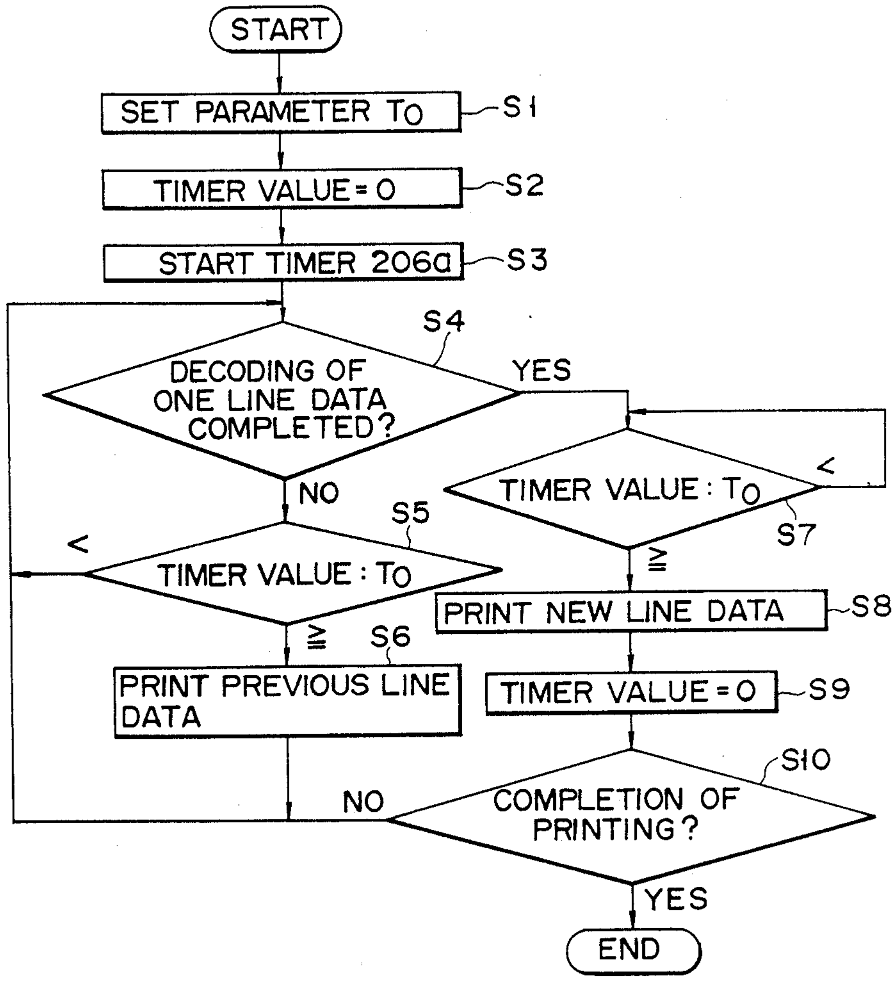
FIG. 23 is an operation flowchart of a recording controller shown in FIG. 3.

The above additional recording control will be described with reference to FIG. 23.

In step S1, a parameter To is set. The parameter To is determined by the timing of an additional recording, a cooling time of the heating element, and the like. In step S2, the timer 206*a* is cleared, and in step S3, it is allowed to start its timer operation. In step S4, it is checked if decoding of the one line image data is completed.

In step S4, if NO, a comparison between a timer value and the parameter To is performed (step S5). If timer value ≧ parameter To, an additional recording is performed by using the image data of the previous recording line (step S6). Then, the process returns to step S4. In step S5, if timer value<parameter To, the process returns to step S4.

In step S4, if YES, a comparison between a timer value and the parameter To. If timer value≧parameter To, the image data of a new recording line is recorded in step S8. In step S9, the timer is cleared.

In step S10, it is checked if the recording operation is completed. If YES, the recording operation completes. If NO, the process of step S4 is executed again.

In this way, the image recording operation including the additional recording is performed.

As described above, the thermal transfer image recording apparatus makes a recording paper closely contact with an ink film whose width corresponds to the width of the thermal head with the aid of a platen roller, and supplies currents to the respective heating elements in accordance with the image data of one recording line as supplied thereto to melt the ink of the ink film, and transfers the melted ink onto the recording paper. Every time the recording of the one recording line image data is completed, the recording paper and the ink film are fed by one recording line in the sub scan direction. The conventional thermal head employs the heating elements of the called partially graze type in which a center of the heating element is protruded, for the reason that a degree of contact of the paper and the film greatly affects an image quality.

Figure 24:
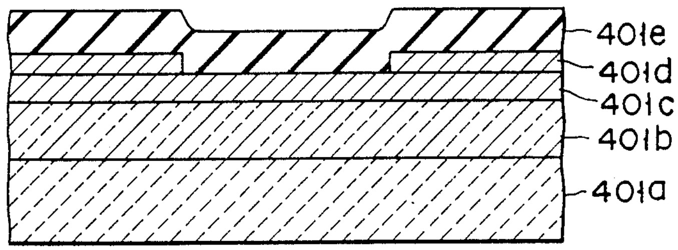
FIGS. 24 and 25 are sectional views showing the structures of an overall graze type thermal head and a partial graze type thermal head.
Figure 25:
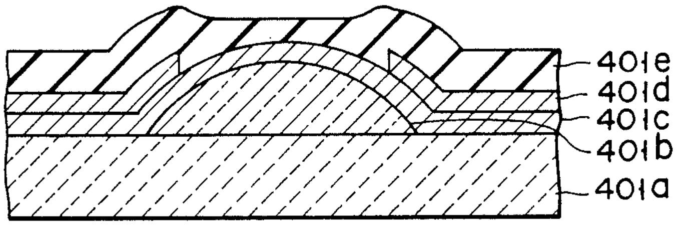

The thermal head comes in two types, a thermal head of the partial graze type (FIG. 24) and a thermal head of the overall graze type in which each heating element is flat at the top (FIG. 25). In both the types of thermal heads, an adiabatic layer 401*b* is layered over a substrate 401*a* made of ceramic. A heating element 401*c* as a resistor film is formed over the layer 401*b*. A pair of electrodes 401*d* are formed on the heating element 401*c*. A protecting layer 401*e* covers the electrodes 401*d*.

In the model of a partial graze thermal head in contact with a platen roller, a maximum pressure $P_O$, nip width "b" and pressure distribution P are described in S. P. Timosheuko and J. N. Goodier, "Theory of Elasticity", McGRAW-HILL, 1970, as follows:

$$P_0=2F/\pi b \tag{1}$$

$$b=\sqrt{4F(K1+K2)R1R2/(R1+R2)} \tag{2}$$

where $$K1=(1-\upsilon 1^2)/\pi E1 \tag{3}$$

$$K2=(1-\upsilon 2^2)/\pi E2 \tag{4}$$

$$P=P_0\sqrt{1-(2x/b)^2} \tag{5}$$

Figure 26:
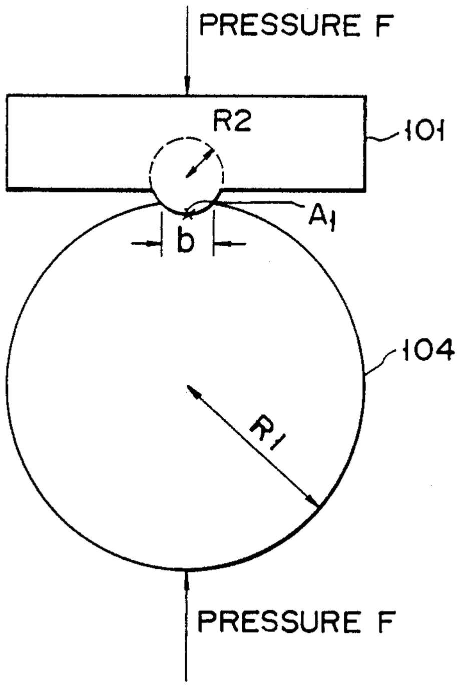
FIG. 26 is a diagram showing a model of the partial graze type thermal head in contact with a platen roller.
Figure 27:
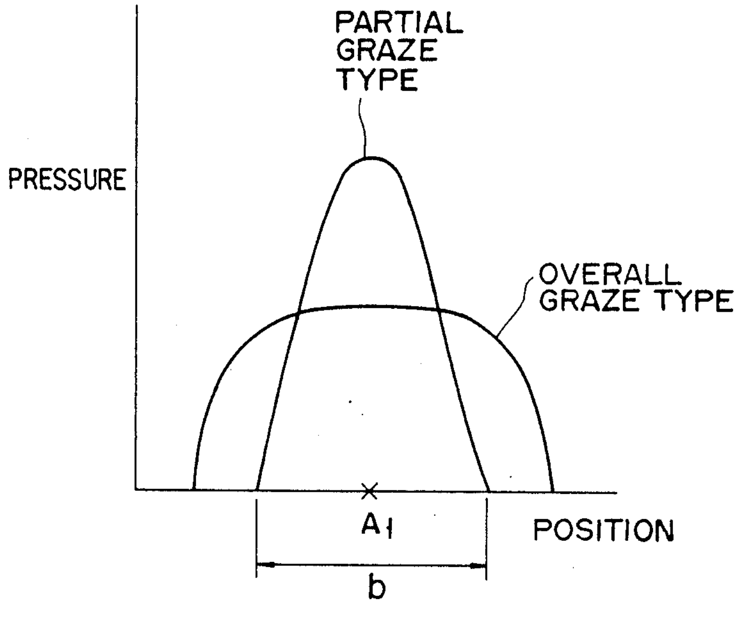
FIG. 27 is a graph showing a pressure distribution in the thermal head when the head is in contact with the platen roller.

In the above relations, F indicates a force acting on the thermal head 101; R1 a radius of the platen roller 104; R2 a radius of a partial graze of the thermal head 101; E1 Young's modulus of the platen roller 104; E2 Young's modulus of the partial graze; υ1 Poisson's ratio of the platen roller 104; υ2 Poisson's ratio of the partial graze; x the coordinates of the partial graze in the circumferential direction in the coordinates system with an origin A1 in FIG. 26. The nip width "b" indicates the width of a contact area where the partial graze of the thermal head 101 contacts the platen roller 104. The recording paper and ink film are nipped by the thermal head and the platen roller. The calculations by using the above equations provides the relationships between the pressure applied and positions in a contact area of the platen roller and the thermal heads of the partial graze type and the overall graze type, as shown in FIG. 27. The pressure-thermal head relationship of the thermal head of the overall graze type can be obtained if $R2\to\infty$.

As seen from FIG. 27, a maximum pressure of the thermal head of the partial graze is higher than that of the thermal head of the overall graze type. Therefore, when using the former thermal head, the ink film and the recording paper are made to more closely contact with each other, and hence an excellent recording of image could be obtained. In the this case, however, the ink at the central part of the heating element is melted and flows toward its surrounding parts a recording density at the central part is lower, and is below a recording density at the surrounding part of the heating element.

Figure 28:
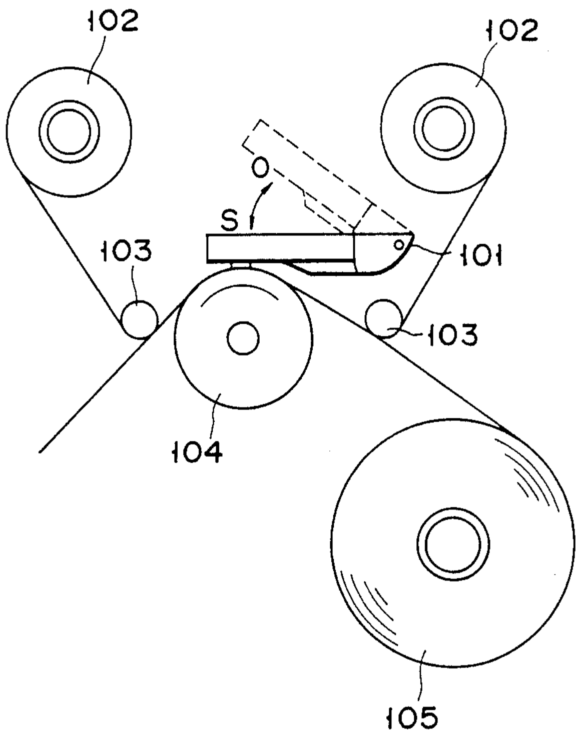
FIG. 28 is a diagram showing how the thermal head is set in the thermal transfer type image recording apparatus.
Figure 29:
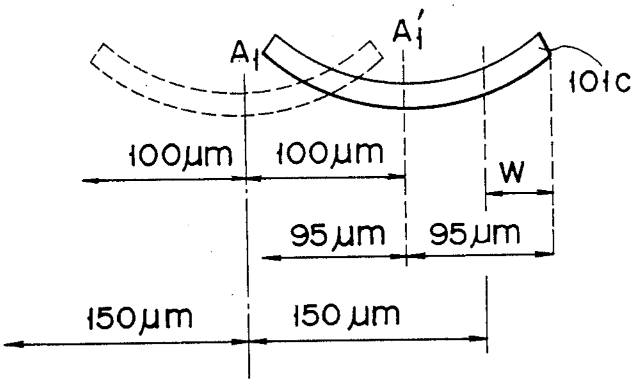
FIG. 29 is a diagram showing a positioning error of a conventional thermal head in connection with a recordable area.
Figure 30:
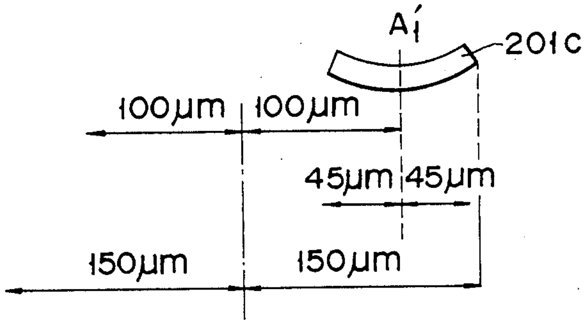
FIG. 30 is a diagram showing a positioning error of a thermal head according to the present invention in connection with a recordable area.

In the thermal transfer image recording mechanism as shown in FIG. 28, the thermal head 101 is swingable about its fixed end in the range of O and S in order to be set the recording paper 105 and the ink film 102 on the platen roller 104. In the setting of the recording paper and the ink film, the thermal head 101 is swung toward position O from position S. After they are set on the platen roller, the thermal head is swung in the reverse direction, so that the mechanism is ready for the thermal transfer recording. If a backlash occurs in the thermal head structure, a center position of the heating element 101*c* of the thermal head 101 would be deviated from its correct position. In FIG. 29, for example, the center position Al of the heating element is shifted to a position Al'. Such a center position shift, which is due to limit a mechanical accuracy, is within a range of about 100 μm. Let us consider that the center position of the heating element 101c is deviated to the center position A1'. The length of a conventional heating element 101c in the sub scan direction is 190 μm. The paper and the film are fed at the pitch of this length of the sub scan direction. In this case, therefore, 45 μm of the width of the heating element is outside the nip width of ±150 μm. In recording an image, the heating element presses the paper and the film against the platen roller, with its width except the 45 μm width. In other words, the width of the heating element minus the 45 μm width is the effective width of the heating element actually contributing to the thermal transfer of image. This reduces a recording efficiency of the thermal head. This defect is proper to the thermal head of the partial graze type, and is found in the thermal transfer type recording apparatus and the heat sensitive recording apparatus as well.

Remember that the sub scan directional length of the heating element of the present invention is about half of that of the conventional heating element. When the heating element 201c is shifted 100 μm from the center A1, the end of the heating element is positioned at a position of 145 μm from the center A1. The position of 145 μm is within the nip width of 150 μm. This indicates that even if the heating element is deviated a maximum of 100 μm, the whole heating element is still positioned within the recordable range, i.e., the nip width. In other words, even in such an extreme case, the whole heating element contributes to the image recording. In this respect, the recording efficiency of the thermal head is improved.

Thus, even when a backlash exists in the thermal head and the positioning of the thermal head i instable, in other words, the thermal head is frequently unexactly positioned, the recording capability of the heating elements of the thermal head is normal or little influenced by the unexact positioning, even if the unexactness is extreme. This results from the feature that the sub scan directional length of the heating element is shorter than the main scan directional length, and consequently the whole heating element is always within the recordable range regardless of the unexact positioning of the thermal head. Further, the heating element according to the present invention has a smaller area than the conventional heating element. Therefore, a pressure difference of the thermal head, which would be caused during the image transfer, provides a less flow of ink on the recording paper and therefore an ink layer transferred on the recording paper is uniform.

While the present invention has been described using a specific embodiment, it should be understood that the invention is not limited to the specific embodiment, but may be variously changed and modified within the spirits and scope of the present invention.

What is claimed is:

1. A thermal head for recording image data on a subject, comprising:

a plurality of heating elements arranged in a main scan direction, for heating the subject moved in a subscan direction, each of the heating elements being shorter in the subscan direction than in the main scan direction;

insulation means for insulating the heating elements from each other; and leading means for leading a current to the heating elements.

2. A system according to claim 1, wherein the length in the subscan direction is L and the length in the main scan direction is 1, and wherein the ratio of L/1 is <1.0.

3. A system according to claim 1, wherein the length in the main scan direction is 110 μm and the length in the subscan direction is 90 μm.

4. A system for recording image data, the system comprising:

buffer means for storing the image data corresponding to a single line;

a thermal head including a plurality of heating elements arranged in a main scan direction, for heating a subject moved in a subscan direction, in accordance with the image data stored in the buffer means, each of the heating elements being shorter in the subscan direction than in the main scan direction;

determining means for determining whether or not the image data corresponding to a single line is stored in the buffer means;

moving means for moving the subject by a predetermined pitch in the subscan direction; and control means for controlling the thermal head and the moving means in accordance with a determination result obtained by the determining means.

5. A system according to claim 4, wherein the determining means includes means for counting a number of image data, to obtain the determination results by comparing the counted number with a predetermined number of image data corresponding to the single line.

6. A system according to claim 4 wherein the control means includes means for providing a timing of an additional recording.

7. A method for recording image data on a subject, the method comprising the steps of:

storing image data corresponding to a single line;

driving a thermal head including a plurality of heating elements arranged in a main scan direction, for heating the subject moved in a subscan direction, each of the heating elements being shorter in the subscan direction than in the main scan direction, to record the stored image data on the subject; and moving the subject by a predetermined pitch in the subscan direction.

8. A method according to claim 7, further comprising the step of performing an additional recording.

* * * * *